United States Patent
Backe

(10) Patent No.: US 6,742,557 B1
(45) Date of Patent: Jun. 1, 2004

(54) DRAIN PAN AND FILTERING SYSTEM FOR A LIQUID CONTAINING DRUM

(76) Inventor: Michael Backe, 8480 Tallahassee Dr. NE, St. Petersburg, FL (US) 33702

( * ) Notice: Subject to any disclaimer, the term of this patent is extended or adjusted under 35 U.S.C. 154(b) by 0 days.

(21) Appl. No.: 10/688,522

(22) Filed: Oct. 17, 2003

(51) Int. Cl.7 .................................................. B65B 1/04
(52) U.S. Cl. ..................................... 141/364; 141/331
(58) Field of Search ................................ 141/364, 106, 141/331–346

(56) References Cited

U.S. PATENT DOCUMENTS

| | | | |
|---|---|---|---|
| 129,141 A | * 7/1872 | Kelly | ........................ 222/109 |
| 5,172,739 A | * 12/1992 | Ristroph | ...................... 141/98 |
| 5,415,210 A | * 5/1995 | Hannah | ...................... 141/333 |
| 5,647,415 A | * 7/1997 | Onders et al. | .............. 141/331 |

* cited by examiner

Primary Examiner—Steven O. Douglas
(74) Attorney, Agent, or Firm—Larson & Larson, PA; James E. Larson

(57) ABSTRACT

An annular pan for mounting over a drum lid containing a liquid, the drum top having a hole for a pump conduit and an air hole. The annular pan has multiple parallel elongated walls increasing in height from the pump conduit to a portion of the pan containing a drain hole axially aligned with the drum lid air hole. The drain hole is covered by a device having a slot into which a fine mesh filter can be inserted for catching debris in liquid. A raised edge of the pan above a top surface of the pan has an indentation for receipt of the pump conduit.

19 Claims, 8 Drawing Sheets

DRAIN PAN AND FILTERING SYSTEM FOR A LIQUID CONTAINING DRUM

BACKGROUND OF THE INVENTION

This invention relates to a pan for collecting liquids spilled while pumping such liquid from a drum. More specifically, it refers to a drain pan cover for a top of a liquid containing drum, the surface of the drain pan having channels for directing spilled liquid to a cover enclosing a drain hole, the drain hole cover having an easily inserted filter to catch debris.

U.S. Pat. Nos. 6,396; 129,141 and 623,345 describe liquid drums with a pump mounted at a top of the drum to pump liquid from the drum. Conduits in the drum lid return spilled liquids back inside the drum. Various other funnels and drip plates are known for placement over a drum to catch leaks and drips. These prior art lids, funnels and drip plates do not have easily installed filters to trap debris from falling into the drum. A pan cover for a fifty-five gallon standard liquid drum having an efficient channel flowing into a drain hole cover containing a removable filter that will catch debris present in the liquid before the liquid reaches the air hole is needed.

SUMMARY OF THE INVENTION

The present invention provides a drain pan for a fifty-five gallon standard liquid containing drum, the drum having a first hole in a top surface for passage of a pump conduit and a second hole constituting an air hole. The drain pan has an annular shape to cover the top of the drum. A multiplicity of parallel walls, increasing in height from the pump conduit to a drain hole, channels dripping liquid downwardly to the drain hole. The drain hole is axially aligned with the air hole of the drum. The drain hole is covered by a drain hole cover into which a fine mesh filter is inserted to catch debris in the liquid.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
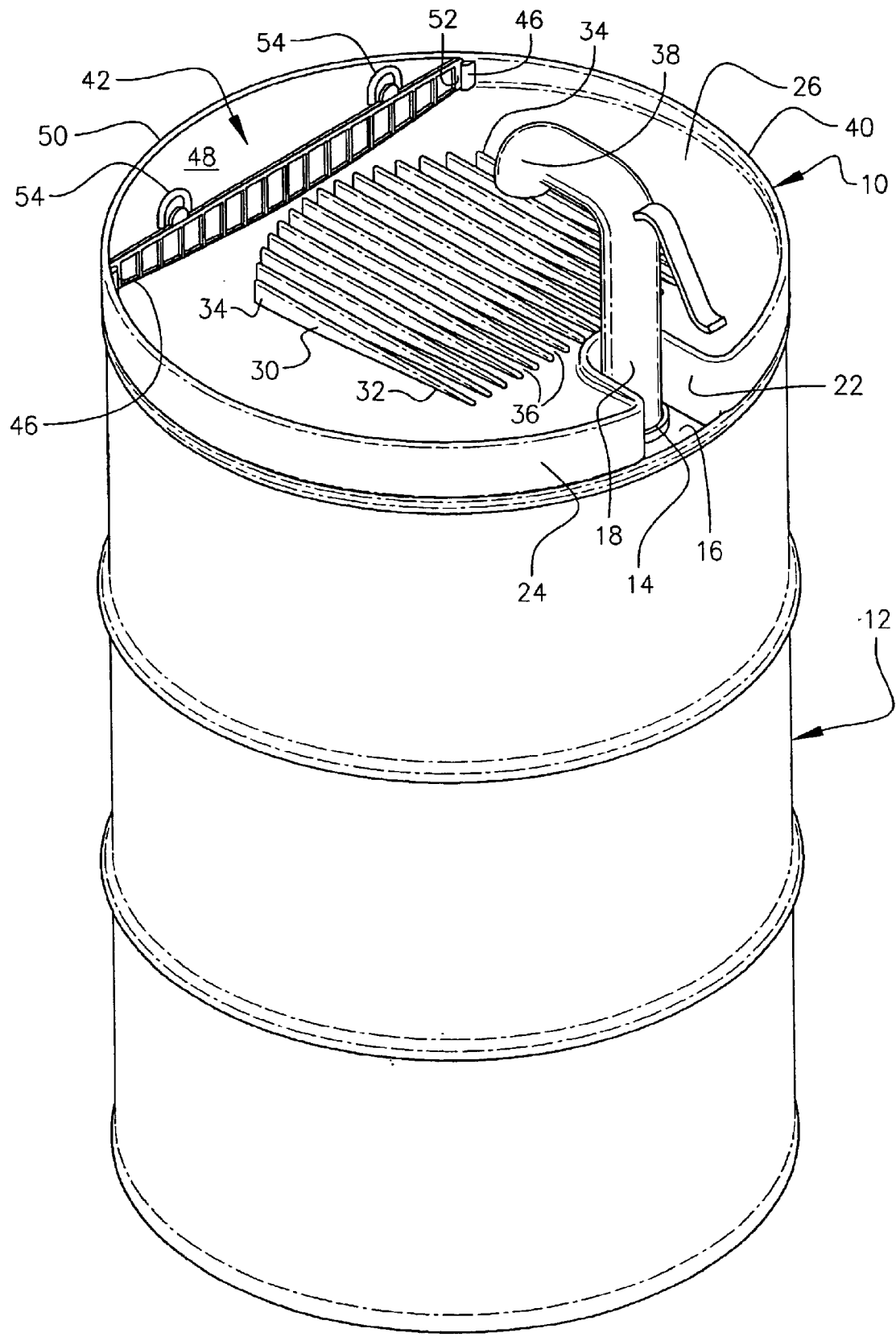
FIG. 1 is a perspective view of a fifty-five gallon drum with an installed pump in its lid, the lid covered by the drain pan of this invention.

Throughout the following detailed description, the same reference numerals refer to the same elements in all figures.

Figure 2:
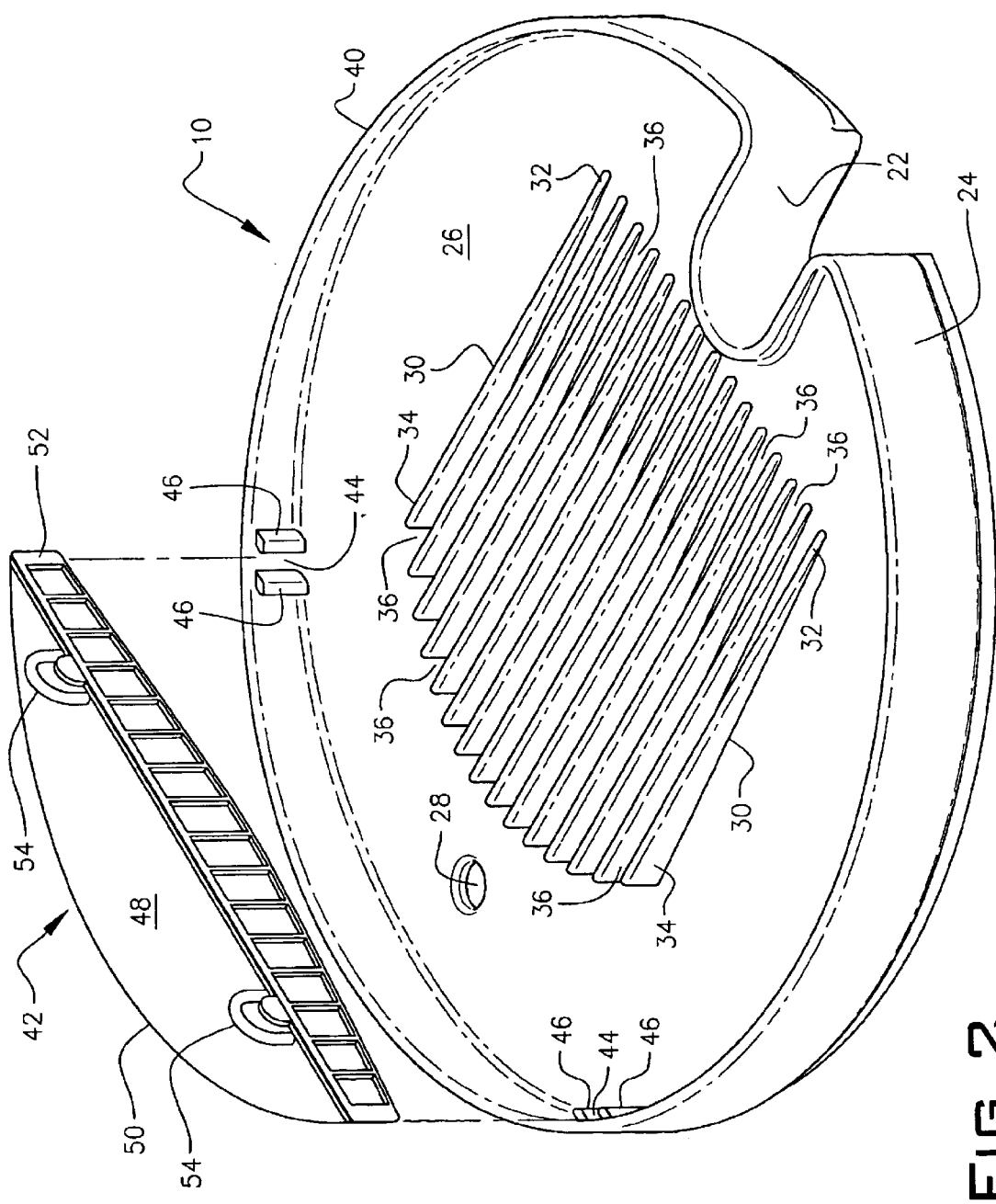
FIG. 2 is an exploded view of the drain pan of this invention.
Figure 5:
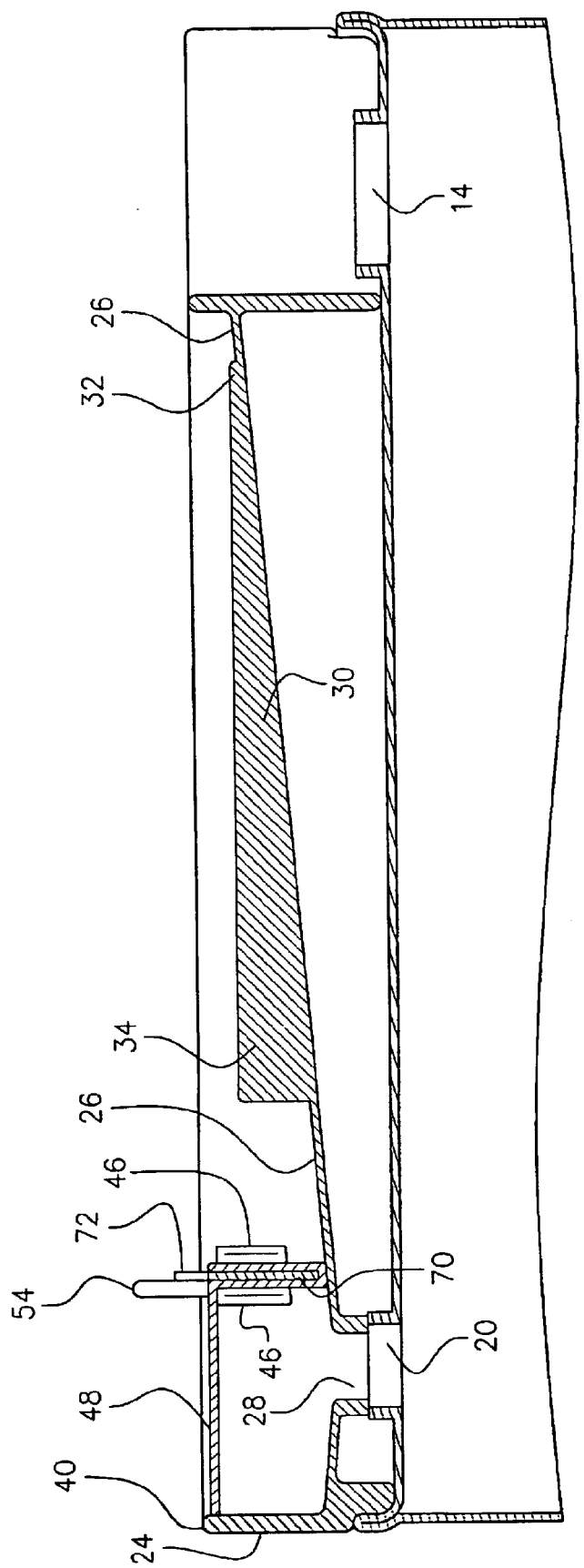
FIG. 5 is a cross sectional view of the drain pan along line 5—5 of FIG. 4.

Referring to FIGS. 1 and 2 the drain pan 10 of this invention has an annular external shape complimentary to the shape of a top surface 16 of a drum 12, preferably a standard fifty-five gallon drum 12 containing a liquid. The drum 12 has a first hole 14 in top surface 16 through which a pump conduit 18 projects upwardly. A second hole 20 is an air hole through top surface 16 as shown in FIG. 5.

The drain pan 10 is positioned over top surface 16 so that an indentation 22 in a side wall 24 accommodates the pump conduit 18. A top surface 26 of the drain pan 10 slants downwardly from a portion around indentation 22 to a drain hole 28 to assist in the flow of liquid. Drain hole 28 is axially aligned to air hole 20 in drum 12. Multiple parallel walls 30 increase in height from a top portion 32 to a bottom portion 34 as seen in FIG. 2. The parallel walls 30 form channels 36 which direct liquid, dripping from spout 38 at an end of pump conduit 18, to the drain hole 28. A rim 40 raises above top surface 26 to form the top edge of side wall 24.

Figure 4:
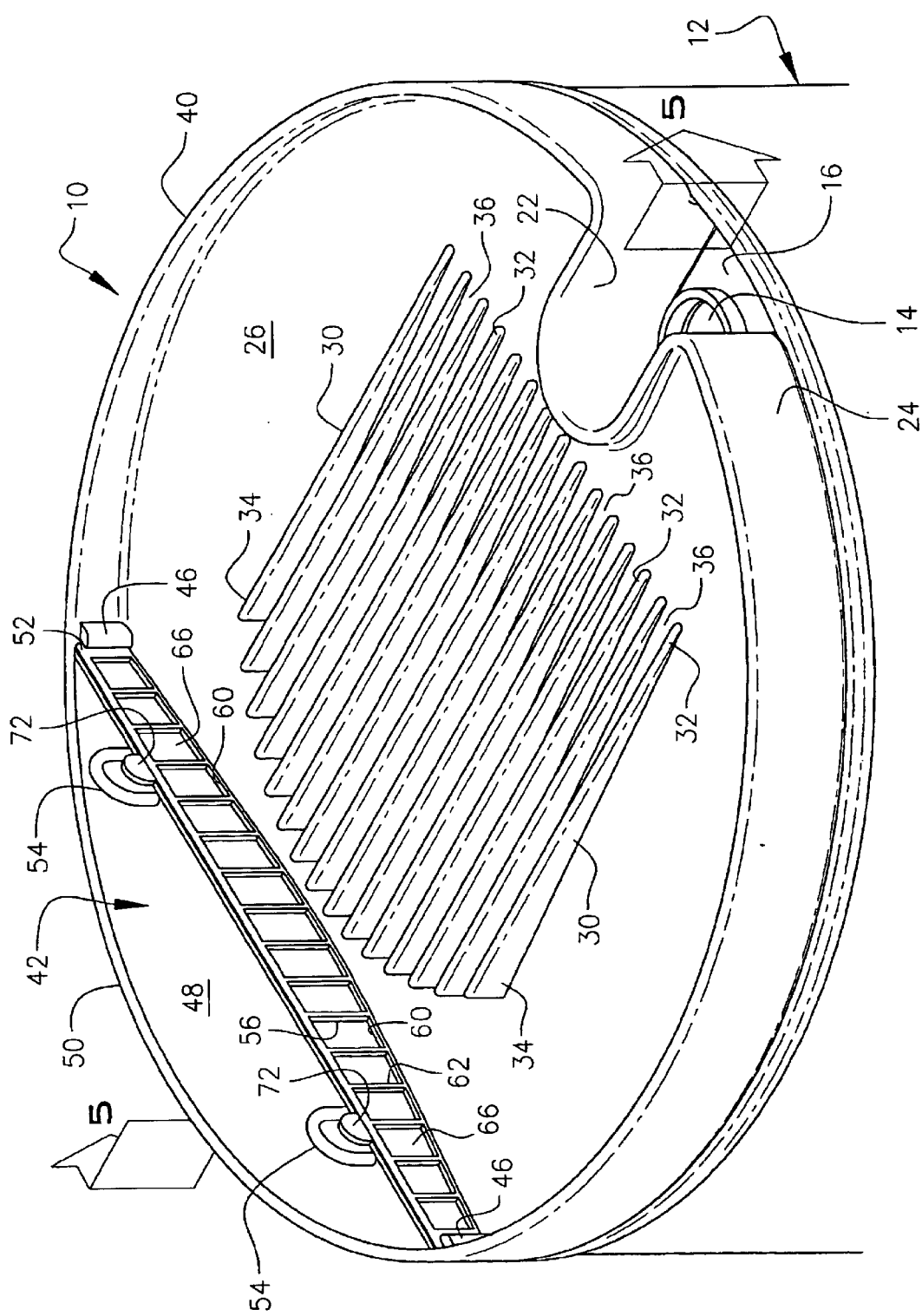
FIG. 4 is an enlarged perspective view of the of the drain pan of FIG. 1 and its drain hole cover over a drum.

An easily inserted drain hole cover 42 is attached and held by friction fit in slots 44 formed by a pair of peg members 46 affixed to the inner circumference of rim 40 of drain pan 10. Drain hole cover 42 has a top surface 48 with a convexly shaped side 50 and a straight side 52. Convexly shaped side 50 is complimentary to the rim 40 of drain pan 10 when the drain hole cover 42 is installed as shown in FIGS. 1 and 4. The straight side 52 has a pair of handles 54 extending upwardly.

Figure 3:
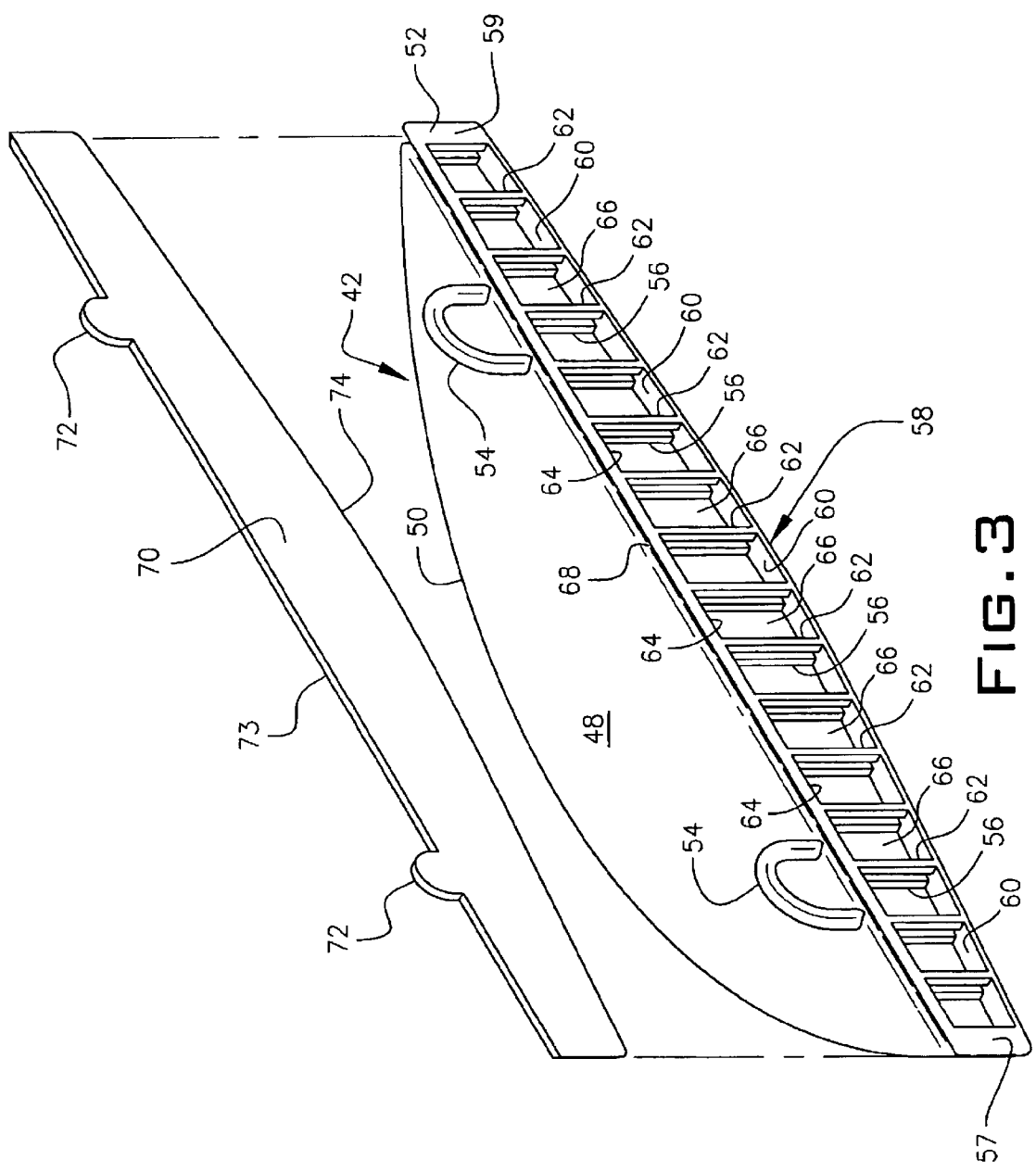
FIG. 3 is an exploded view of the drain hole cover of this invention.

Referring to FIG. 3, the straight side 52 has a rear set of downwardly depending paralleled disposed ribs 56 decreasing slightly in height from the center 58 to each side 57 and 59 respectively. The ribs 56 terminate in a bottom edge 60 which has a shape complimentary to the slant of the top surface 26 of drain pan 10. The bottom edge 60 has a front set of upwardly depending paralleley disposed ribs 62, decreasing slightly in height from the center portion 58 outwards to each side 57 and 59. The front set of ribs 62 terminates in a top edge 64 which is level with the top surface 48 of drain hole cover 42. The front set of ribs 62 is axially aligned with the rear set of ribs 56 forming openings 66 to allow liquid to pass through. The front 62 and rear 56 set of ribs also form a horizontal slot 68 into which a fine mesh filter 70 can be inserted as shown in FIGS. 3 and 5.

Referring to FIG. 3, the fine mesh filter 70 has a pair of tabs 72 on its top edge 73 to aid in insertion and removal. The bottom edge 74 of the fine mesh filter 70 has a shape complimentary to the bottom edge 60 of the drain hole cover 42. The filter 70 is inserted into the slot 68 and is held in place by a friction fit. As liquid drips from the spout 38, it flows down the slant of the drip pan 10, and through the channels 36. The liquid passes through the openings 66 between the ribs 62, and the filter 70 catches any debris present in the liquid.

Figure 6:
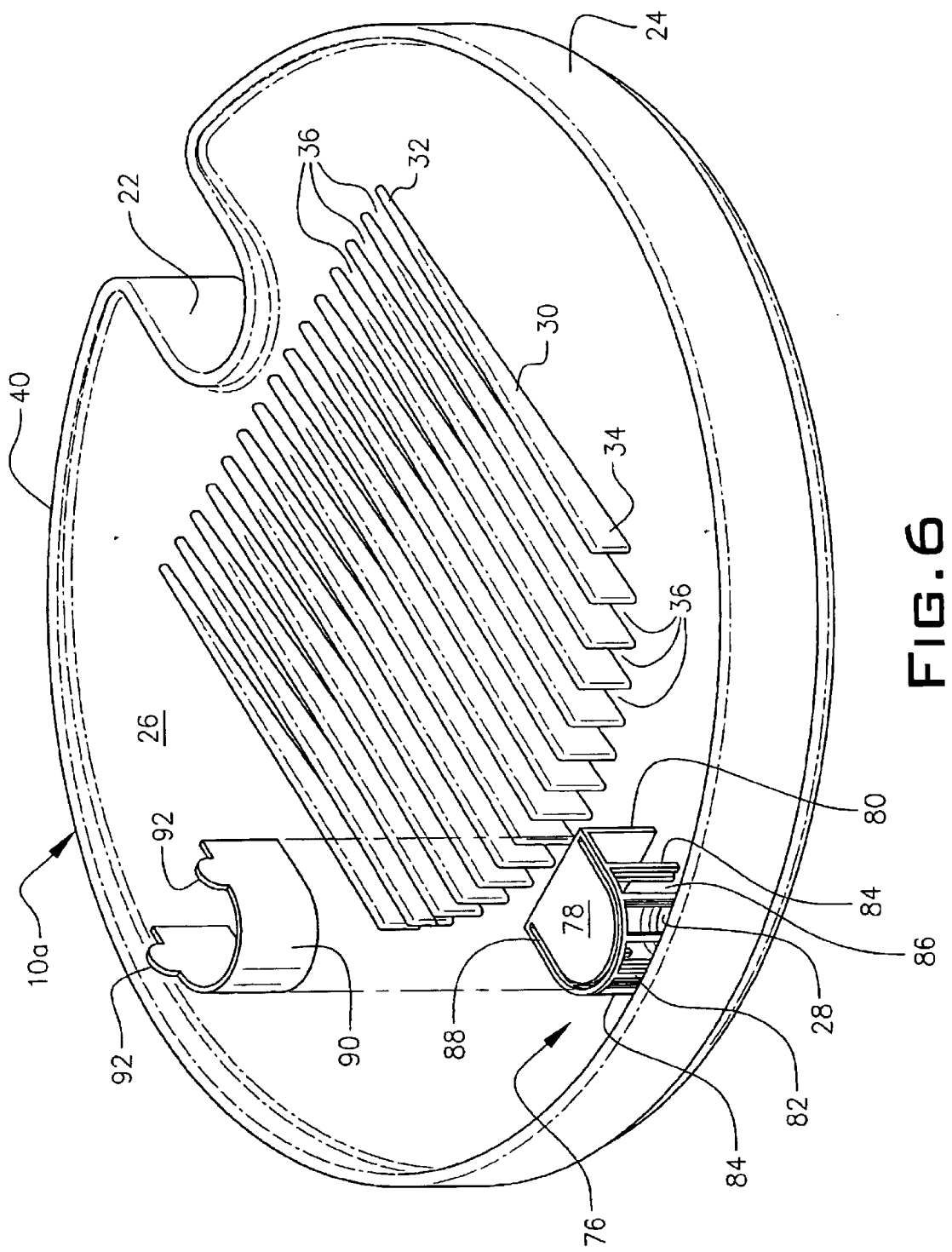
FIG. 6 is an exploded view of a the drain pan with an alternate smaller drain hole cover mounted over the drain hole.
Figure 7:
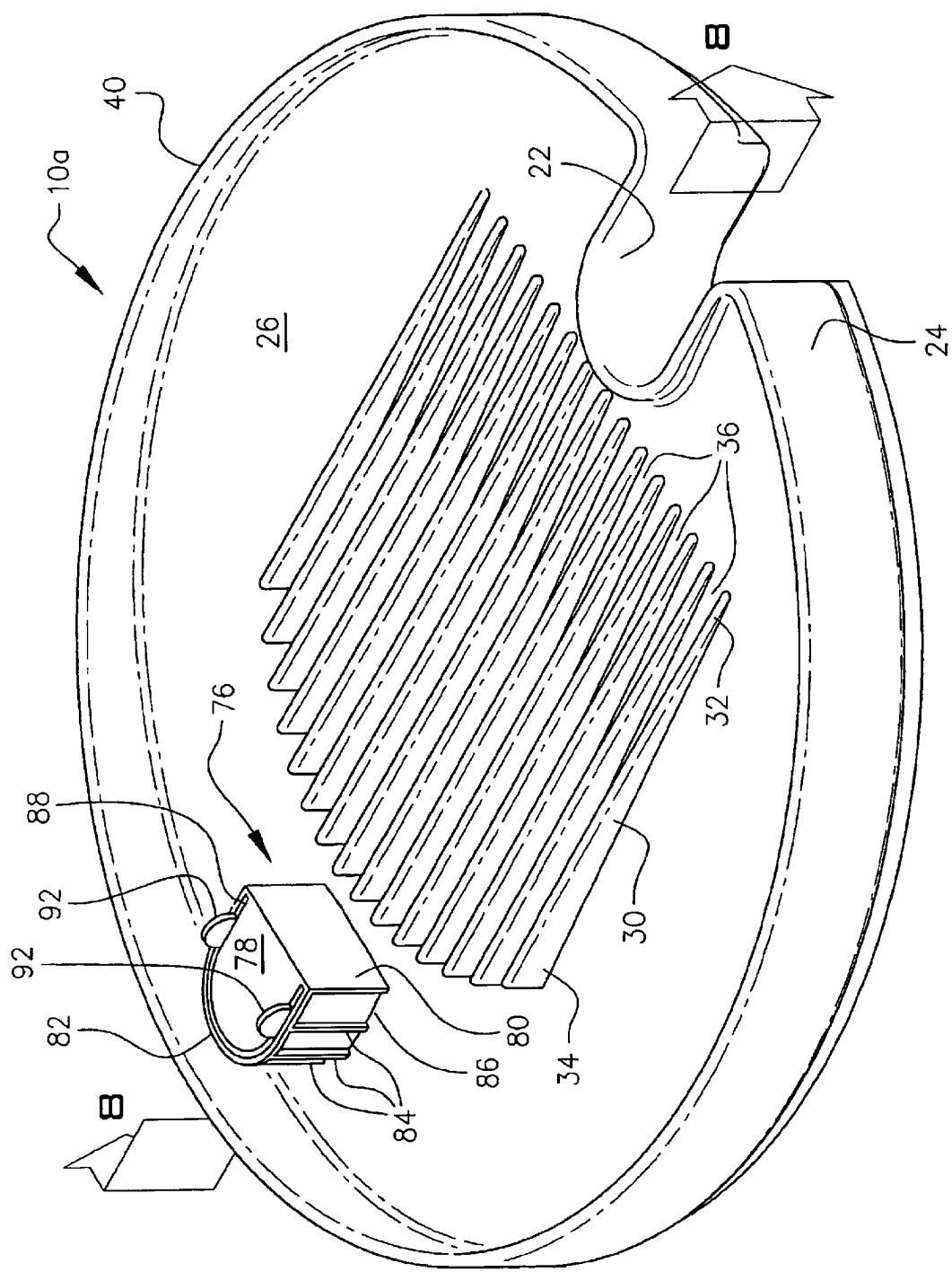
FIG. 7 is a perspective view of the drain pan and drain hole cover of FIG. 6.
Figure 8:
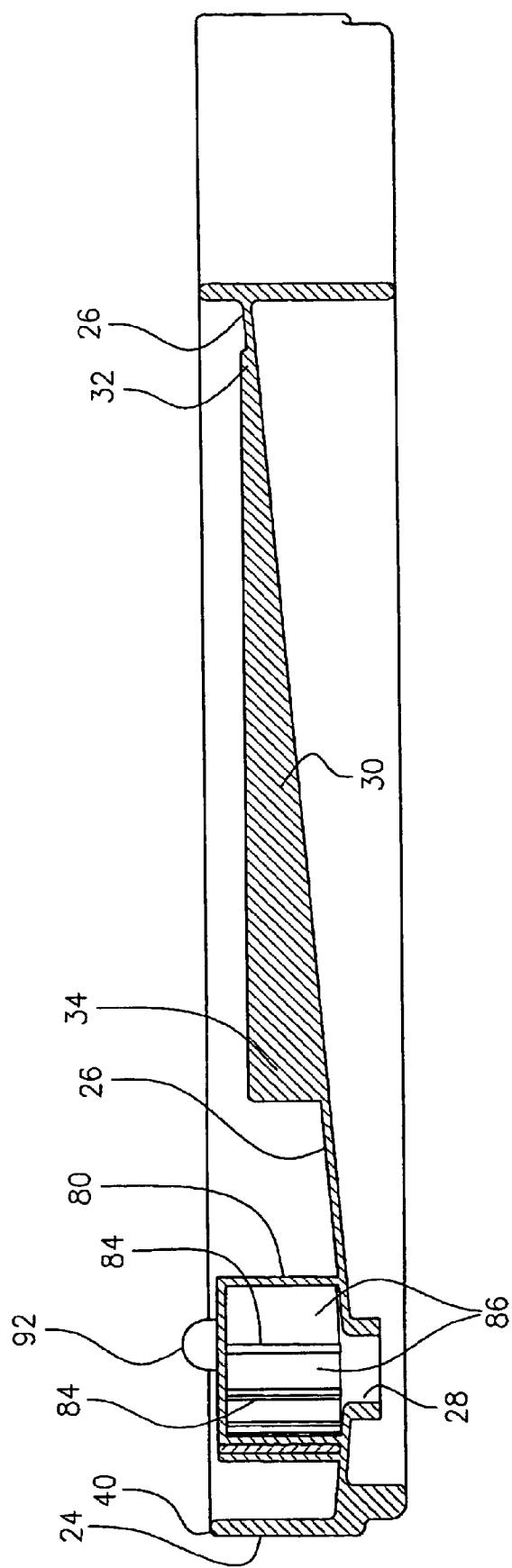
FIG. 8 is a cross-sectional view along line 8—8 of FIG. 7.

Alternatively, as seen in FIGS. 6, 7, and 8, a drain pan 10a can substitute a small drain hole cover 76 having a top surface 78 with a straight solid front wall 80 and a semicircular rear wall 82. Front wall 80 terminates at, and is integrally connected to, the top surface 78 of the drain pan 10a. The semicircular rear wall 82 is composed of a forward and rear set of downwardly depending axially aligned paralleley disposed ribs 84 terminating and integrally connected at the top surface 78 of the drip pan 10a. The forward and rear set of ribs form openings 86 and a slot 88. A fine mesh filter 90 is inserted into the slot 88 in the top surface 78 of the small drain hole cover 76. As seen in FIG. 6, the fine mesh filter 90 has a pair of tabs 92 located near each end of the top edge to aid in insertion and removal of the filter 90.

As liquid drips from the spout 38, it flows down the slant of the drip pan 10a, and through the channels 36. As the liquid reaches the front wall 80 of the small drain hole cover 76, it is diverted around the wall and eventually reaches the openings 86. The liquid passes through the openings 86, and then through the fine mesh filter 90 where any debris present in the liquid will be caught before reaching the drain hole 28.

The drain pan 10 or 10a and its parts can be made from steel or aluminum or from a high strength polymer such as polycarbonate or polypropylene.

Other equivalent elements can be substituted for the elements of the inventive drain pan 10 or 10a to accomplish substantially all of the same results in substantially the same way.

What is claimed is:

1. An annular drain pan mountable over a drum lid, the drum lid integral with a drum containing a liquid, a pump mounted through a first opening in the drum lid and a second opening in the drum lid adapted to function as an air hole, the annular drain pan comprising, multiple parallel channels on a top surface for conducting liquids in the drain pan downwardly from the pump to a drain hole, the drain hole vertically aligned with the second opening in the drum lid;

a drain hole cover mounted over the drain hole of the drain pan, the cover having a removable fine mesh filter to prevent solid particles from falling into the drum; and the annular drip pan having a raised annular rim over the top surface and a side edge having a U-shaped indentation to accommodate an upwardly directed pump conduit.

2. The annular drain pan according to claim 1 wherein multiple parallel channels are formed between multiple pairs of longitudinally extending walls having a height increasing from the pump conduit to a portion of the drain pan adjacent the drain hole.

3. The annular drain pan according to claim 1 wherein the drain hole cover has a front face composed of multiple spaced apart rear and front vertically disposed, axially aligned, parallel ribs forming openings through which liquid can flow and a slot along a top horizontal edge into which a fine mesh filter is removably inserted to catch debris in liquid dripping from the pump.

4. The annular drain pan according to claim 1 wherein a first and second end of the drain hole cover is mounted in slots formed by a first and second pair of peg members affixed to an inner circumference wall of the drain pan.

5. The annular drain pan according to claim 3 wherein the drain hole cover has a pair of handles mounted to a top surface.

6. The annular drain pan according to claim 1 wherein the drain hole cover has a removable fine mesh filter positioned in a slot formed by multiple rear and front ribs spaced apart, the filter held in place by a friction fit at a front portion of the drain hole cover.

7. The annular drain pan according to claim 1 wherein the drain pan covers the top surface of a fifty-five gallon drum.

8. An annular drain pan mountable over a drum lid, the drum lid integral with a drum containing a liquid, a pump mounted through a first opening in the drum lid and a second opening in the drum lid adapted to function as an air hole, the annular drain pan comprising, a raised annular rim over a top surface and a side edge having a U-shaped indentation to accommodate an upwardly directed pump conduit;

the top surface slanted downwardly from the U-shaped indentation to a drain hole axially aligned with the second opening of the drum, the top surface having multiple parallel channels for conducting liquids in the drain pan downwardly from the pump to the drain hole; and a drain hole cover mounted over the drain hole, the cover having a removable fine mesh filter to prevent solid particles from falling into the drum.

9. The annular drain pan according to claim 8 wherein the drain hole cover has a convexly shaped rear edge that fits complimentary to the rim of the drain pan.

10. The annular drain pan according to claim 8 wherein the drain hole cover has a straight front face, the front face having a having a rear and front set of axially aligned, parallel, vertically disposed ribs, the ribs attached between a bottom edge and top edge of the front face.

11. The annular drain pan according to claim 10 wherein the axially aligned ribs form openings through which a liquid flows, the rear and front multiple spaced ribs forming a vertical slot along the top edge.

12. The annular drain pan according to claim 11 wherein the drain hole cover has a removable fine mesh filter positioned in the vertical slot.

13. The annular drip pan according to claim 8 wherein the drain pan covers a fifty-five gallon drum.

14. In a liquid containing cylindrical drum closed at a first end with a base member and at a second end with a lid, the lid having a first opening as a vertical conduit for a pump and a second opening as an air hole, the lid covered with an annular drain pan, the improvement wherein the annular drain pan comprises, multiple parallel channels on a top surface for conducting a liquid dripping from the pump downwardly to a portion of the drain pan containing a drain hole, the drain hole vertically aligned with the second opening in the drum lid;

each multiple parallel channel formed between a pair of longitudinally extending walls having a height increasing from the pump conduit to the portion of the drip pan containing the drain hole;

a cover mounted over the drain hole and integrally connected to the top surface of the drain pan having a removable fine mesh filter to prevent debris from falling into the drum;

the annular drain pan having a raised annular rim over the top surface and a side edge having a U-shaped indentation to accommodate the vertical conduit for directing the pump.

15. The annular drain pan according to claim 14 wherein a drain hole cover is mounted over the drain hole, the drain hole cover having a semicircular rear wall and a solid front wall, the semicircular rear wall having a forward and rear set multiple vertically disposed, axially aligned, parallel ribs forming openings through which liquid flows, the forward and rear set of ribs forming a vertical slot with an opening in the top surface of the drain hole cover.

16. The annular drain pan according to claim 14 wherein the forward and rear set of multiple parallel ribs terminate at, and are integrally connected to, a top surface of the drain pan.

17. The annular drain pan according to claim 14 wherein the drain hole cover has a solid front wall that terminates at, and is integrally connected to, the top surface of the drain pan.

18. The annular drain pan according to claim 15 wherein a removable filter having a pair of tabs on a top edge is positioned in the vertical slot formed by the forward and rear set of ribs.

19. The annular drain pan according to claim 14 wherein the drain pan is mounted over the lid of a fifty-five gallon drum.

* * * * *